UNITED STATES PATENT OFFICE.

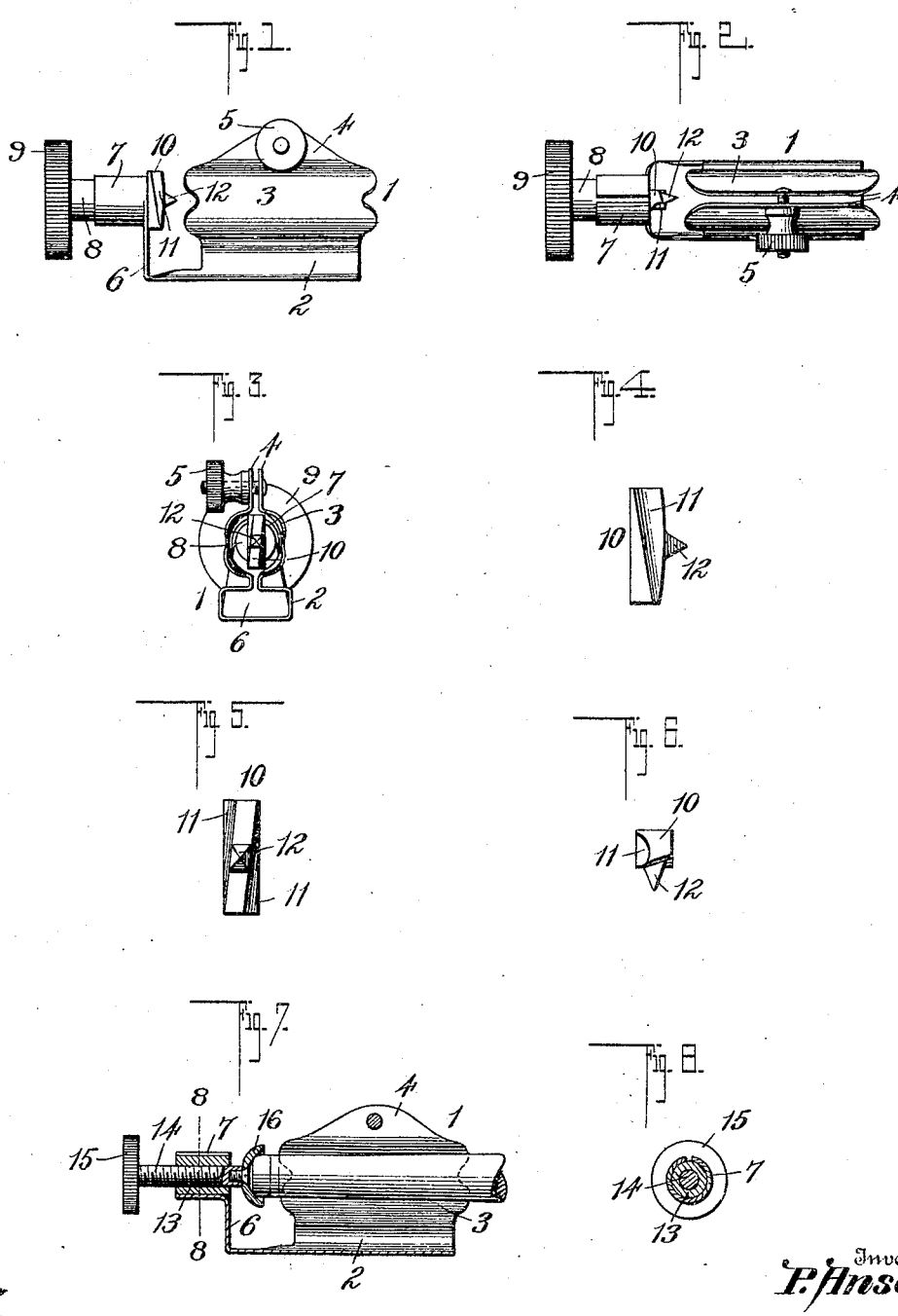

PERCY ANSELL, OF WASHINGTON, DISTRICT OF COLUMBIA.

CUE-TIP TRIMMER.

942,876.
Specification of Letters Patent.
Patented Dec. 14, 1909.

Application filed March 8, 1909. Serial No. 482,093.

*To all whom it may concern:*

Be it known that I, PERCY ANSELL, a subject of the King of Great Britain, residing at Washington, in the District of Columbia, have invented a new and useful Improvement in Cue-Tip Trimmers, of which the following is a specification.

This invention relates to a device for cutting or trimming cues for the purpose of inserting new tips in position.

The object of the invention is a device of this kind, which is simple in construction, and which can be manufactured and sold at a low price.

The invention consists in the novel features of construction hereinafter set forth, pointed out in the claims and shown in the accompanying drawings, in which:

Figure 1 is a side elevation of the device. Fig. 2 is a plan view. Fig. 3 is an end view. Fig. 4 is an enlarged side elevation of the cutter. Fig. 5 is a face view of the cutter. Fig. 6 is an end view of the cutter. Fig. 7 is a longitudinal section through the device with a tip holding attachment substituted for the cutter. Fig. 8 is a cross section on the line 8—8 of Fig. 7.

In constructing the device, I form a holder 1 which is stamped out of a single piece of thin spring steel, the blank from which the device is formed being bent over upon itself to form a hollow base 2 and then bent to form a longitudinal split spring sleeve 3 extending above and parallel to the base 2, and provided with upwardly extending flanges 4 which are brought together by means of a set screw 5 working through them, thereby clamping the cue in the sleeve. From the base extends an upwardly angled arm 6 which also carries a sleeve 7 in alinement with the sleeve 3, and rotatably and slidably mounted in the sleeve 7 is a shaft 8 which carries at its outer end a circular milled head 9 and upon its inner end a cutter 10. The cutter is carried at right angles to the shaft and is fixed to it, and as shown in the drawings, the cutter is oppositely beveled or cut out upon opposite sides as shown at 11, forming cutting edges, and a centering forwardly projecting tooth 12 is also carried by the cutter.

In use, the cue is put into the sleeve locked by the set screw 5, and the milled head 9 is rotated by the fingers of the right hand and at the same time the shaft 8 is pressed inwardly, the pressure combined with the rotation of the shaft causing the cutter to perform its work.

In order to hold the tip in place, I fit into the sleeve 7 of one of the holders 1 a threaded bushing 13 through which works a threaded rod 14 having a milled head 15 upon its outer end, and a concavo convex plate 16 upon its inner end. After the tip has been placed in the cut made by the cutters, the head 15 is rotated bringing the plate 16 against the top and holding it in place until the adhesive by means of which it is secured has set.

It will be understood of course that while the holder shown in Fig. 1 and the holder shown in Fig. 7 are exactly alike, it is intended to furnish the device in sets, one holder being provided with the cutting device and the other holder being provided with the threaded rod and concaved plate shown in Fig. 7, as it is much easier to transfer the material operated upon from one holder to another than to change the cutters and tip holding means, which would be necessary if only one holder was supplied. The cutting tool is therefore permanently held in the sleeve 7, and the bushing 13 is also permanently held in the sleeve 7 of its holder.

What I claim is:

1. A device of the kind described comprising a holder bent from a single piece of spring steel, said holder comprising a longitudinal split sleeve to receive a cue, means for clamping the split edges of the sleeve together, an angled arm, a sleeve carried by said arm in alinement with the first mentioned sleeve, and means rotatably mounted in the last mentioned sleeve for operating upon parts held in the first mentioned sleeve.

2. A holder of the kind described struck from a single piece of spring metal, said holder comprising a hollow base, a longitudinal split sleeve mounted above and parallel to said base, upwardly extending flanges carried by the sleeve, a set screw working through said flanges and drawing them toward or away from each other, an angled arm extending from one end of the base, and a sleeve carried by said arm in alinement with the first mentioned sleeve.

3. A device of the kind described comprising a holder consisting of a hollow base, a longitudinally split spring metal sleeve carried by and parallel to the base, means for clamping the edges of the sleeve together, an arm extending from the base, a sleeve carried by the arm and in alinement with the first mentioned sleeve, a shaft rotatably and slidably mounted in said sleeve, a milled head carried by the outer end of the shaft, and a cutter carried by the inner end of the shaft.

4. A device of the kind described comprising a base, a longitudinally split spring metal sleeve integrally connected with said base, upwardly extending flanges carried by the sleeve, a set screw working through said flanges, an angled arm extending from one end of the base, a sleeve carried by said arm and in alinement with the first mentioned sleeve, a smooth shaft loosely mounted in said second mentioned sleeve, a milled head carried by the outer end of said shaft, and a cutter carried by the inner end of the shaft, as and for the purpose set forth.

PERCY ANSELL.

Witnesses:
CHAS. E. BROCK,
E. B. McBATH.